(12) United States Patent
Hundley et al.

(10) Patent No.: US 10,030,731 B1
(45) Date of Patent: Jul. 24, 2018

(54) ASSEMBLY WITH NEGATIVE TORSIONAL STIFFNESS

(71) Applicant: HRL LABORATORIES, LLC, Malibu, CA (US)

(72) Inventors: Jacob M. Hundley, Los Angeles, CA (US); Christopher P. Henry, Thousand Oaks, CA (US); Geoffrey P. McKnight, Los Angeles, CA (US); Andrew C. Keefe, Encino, CA (US); Sloan P. Smith, Woodland Hills, CA (US); Jacob J. Mikulsky, Santa Monica, CA (US); Gavin Chang, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 116 days.

(21) Appl. No.: 13/802,197

(22) Filed: Mar. 13, 2013

(51) Int. Cl.
*F16F 1/14* (2006.01)
*F16F 3/02* (2006.01)
*F16F 1/48* (2006.01)
*F16D 3/56* (2006.01)

(52) U.S. Cl.
CPC .................. *F16F 1/14* (2013.01); *F16D 3/56* (2013.01); *F16F 1/48* (2013.01); *F16F 3/02* (2013.01); *F16F 2228/063* (2013.01)

(58) Field of Classification Search
CPC ........ F16D 3/56; F16D 3/62; F16F 2228/063; F16F 2236/08; F16F 2238/024; F16F 1/48; F16F 15/1216; F16F 15/1337

USPC .................... 464/84, 100, 101; 267/156, 164
See application file for complete search history.

(56) References Cited

U.S. PATENT DOCUMENTS

| 3,464,233 A * | 9/1969 | Brouwers ................. F16D 3/14 464/101 |
| 3,577,802 A * | 5/1971 | Rumsey ..................... 74/573.12 |
| 4,257,510 A * | 3/1981 | Fisher ..................... F16D 13/68 192/207 |
| 4,884,790 A | 12/1989 | Castrilli |
| 5,307,913 A * | 5/1994 | Szadkowski ........ F16F 15/1213 192/200 |
| 5,322,149 A * | 6/1994 | Szadkowski ............... 192/70.17 |
| 5,967,283 A * | 10/1999 | Kemper ................ F16D 13/583 192/109 A |
| 2003/0176223 A1* | 9/2003 | Aoki ............................. 464/100 |
| 2008/0205976 A1* | 8/2008 | Jeandot .................... B64G 1/66 403/164 |
| 2014/0265077 A1* | 9/2014 | Hinks ....................... F16F 3/10 267/151 |

FOREIGN PATENT DOCUMENTS

DE    3926384 A1 *  2/1991  .............. F16D 3/12

OTHER PUBLICATIONS

Machine translation of DE 3926384 (no date).*

(Continued)

*Primary Examiner* — Nicholas J Lane
(74) *Attorney, Agent, or Firm* — Lewis Roca Rothgerber Christie, LLP

(57) ABSTRACT

A negative stiffness torsional spring. A plurality of spokes secured between a hub and an outer cylinder assembly are preloaded in compression. As the hub is rotated, the stiffness of the torsional spring is negative over a range of angles.

28 Claims, 11 Drawing Sheets

(56) References Cited

OTHER PUBLICATIONS

Translation of DE 3926384 A1, (Koytcheff, John, USPTO, Sep. 23, 2016).*
Kim, Gi-Boo, "New Concept Design of Torsional Damper for Advances Automotive Transmissions," 2012 FISITA World Automotive Congress, Abstract.
Wu et al., "Modeling of a Bistable MEMS Mechanism with Torsion/Cantilever Beams," IEEE, pp. 153-156, Jan. 2010.

* cited by examiner

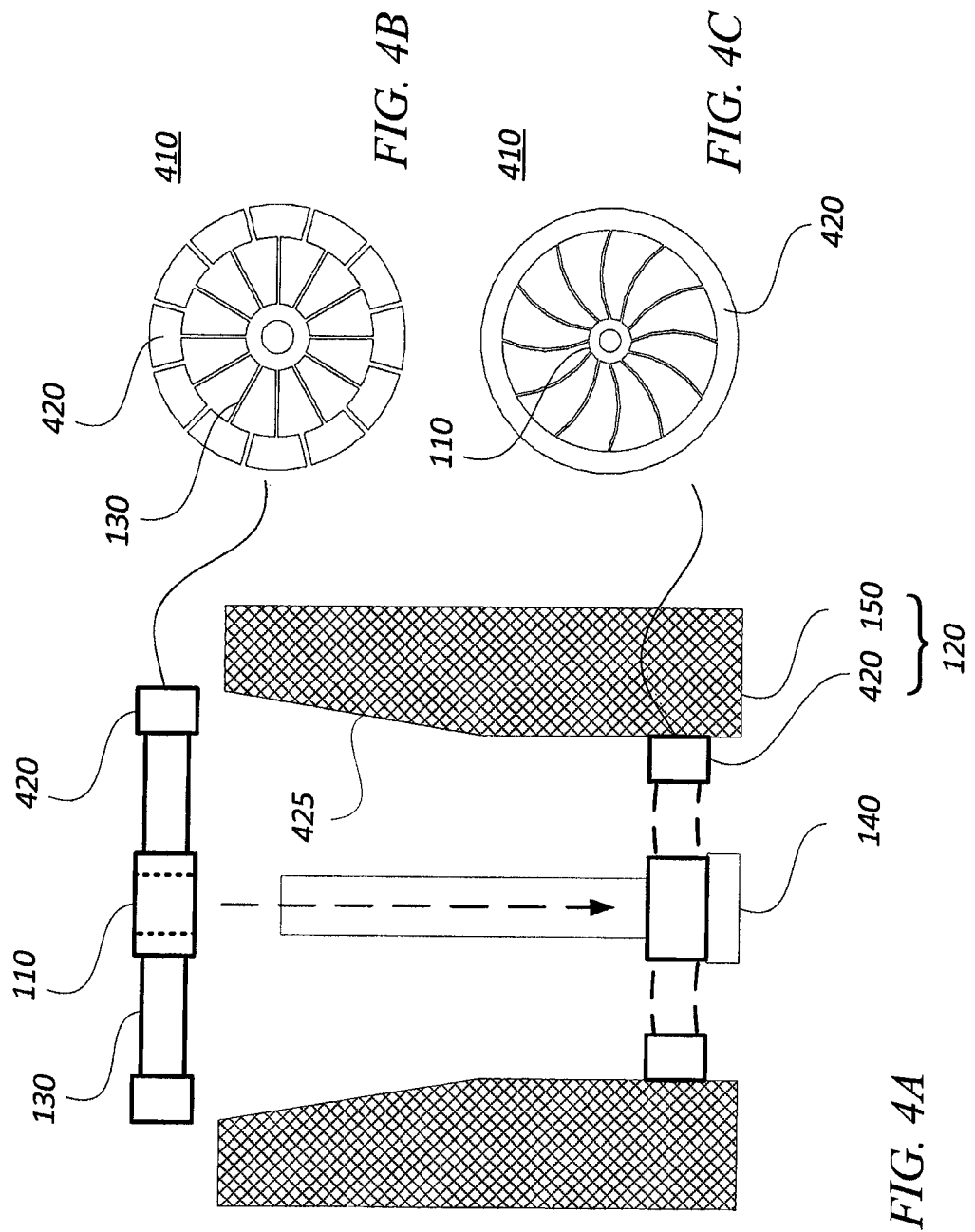

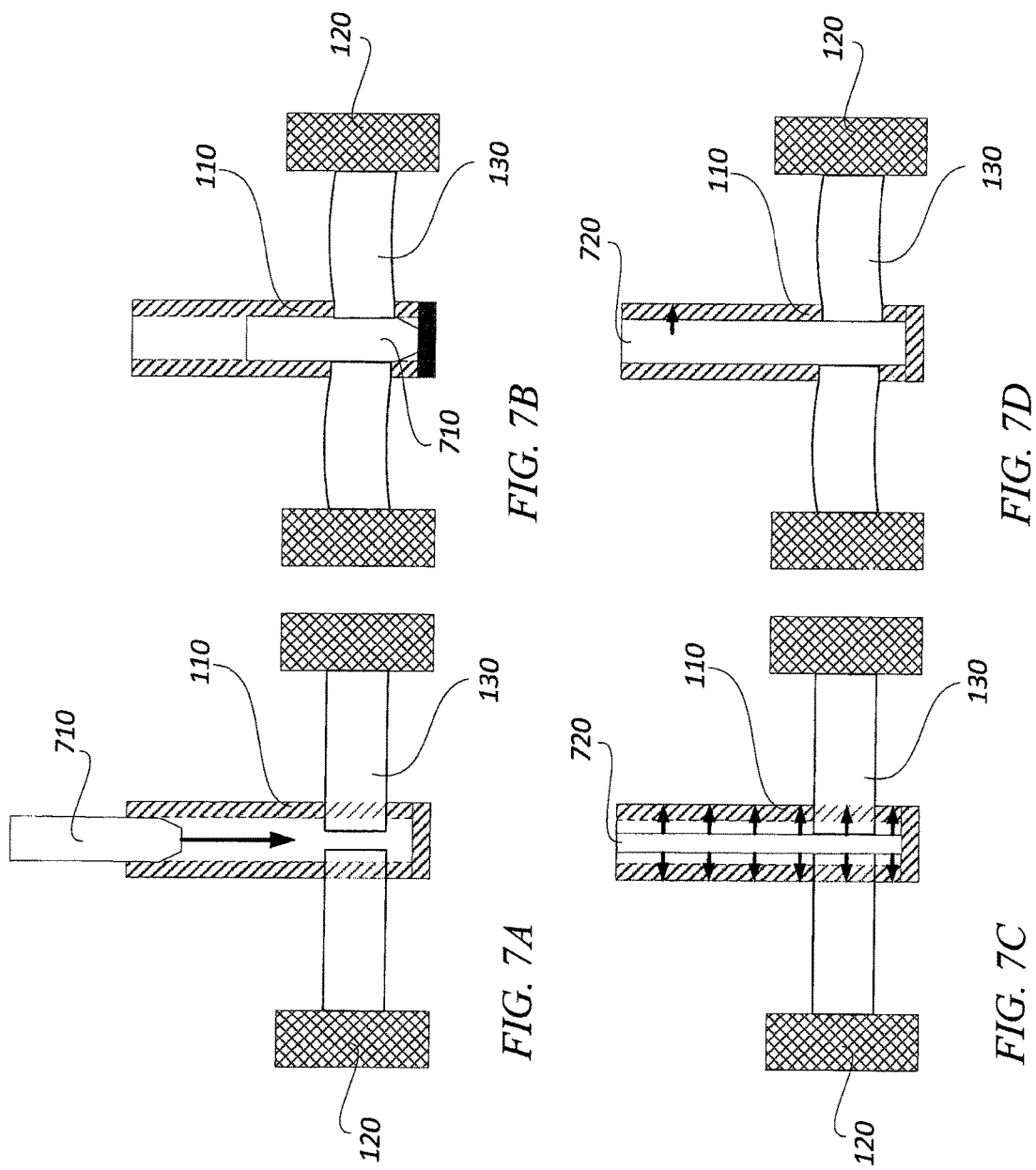

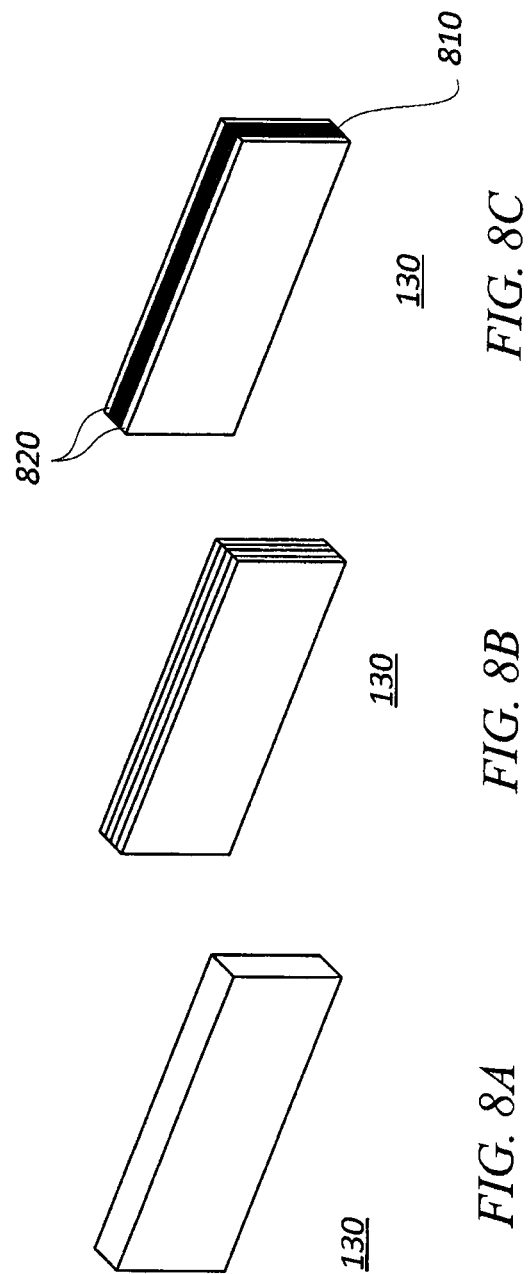

ASSEMBLY WITH NEGATIVE TORSIONAL STIFFNESS

STATEMENT REGARDING FEDERALLY SPONSORED RESEARCH OR DEVELOPMENT

This invention was made with government support under contract # HR0011-10-C-0125 awarded by the Defense Advanced Research Projects Agency (DARPA). The government has certain rights in the invention.

FIELD

The present invention relates to mechanical elements used in torsion and more particularly mechanical elements having negative torsional stiffness over a range of angles of rotation.

BACKGROUND

In numerous mechanical design applications, including the design of isolators and of bi-stable elements, negative stiffness elements are potentially useful. For example, a soft spring may improve the performance of an isolator using such a spring, and a soft spring may be fabricated by combining a positive stiffness spring with a negative stiffness spring. Negative stiffness elements also may display bi-stable behavior, if the range of motion over which the element exhibits negative stiffness is less than the total range of motion of the element.

A negative torsional spring may have applications in these categories, for example being useful in fabricating a drive shaft isolator with a low spring constant, or in fabricating a hinge with two stable positions, which may be used, for example to provide two stable positions for a component on a satellite, e.g., stowed for launch, and deployed. Negative torsional stiffness elements may be constructed by coupling a linear, or axial, negative stiffness element to a rotating element, e.g., using a conversion mechanism, such as a rack and pinion arrangement, to convert rotational motion to translational motion, but such solutions add mass and may be subject to wear. Thus, there is a need for an assembly with negative torsional stiffness which does not rely on a conversion mechanism to convert rotational motion to translational motion.

SUMMARY

The present invention relates to a negative stiffness torsional spring composed of a plurality of spokes secured between a hub and an outer cylinder assembly. The spokes are preloaded in compression. As the hub is rotated, the stiffness of the torsional spring is negative over a range of angles.

According to an embodiment of the present invention there is provided a negative stiffness torsional spring, including: a hub; an outer cylinder assembly, concentric with the hub; and a plurality of spokes, having a compressional preload, the plurality of spokes being secured to the hub and secured to the outer cylinder assembly.

In one embodiment, the compressional preload is sufficient to cause the torsional stiffness to be negative at one rotational position of the hub with respect to the outer cylinder assembly.

In one embodiment, the outer cylinder assembly includes a hollow cylinder; and each spoke is secured to the inner surface of the hollow cylinder.

In one embodiment, the hollow cylinder is segmented into a plurality of segments, and wherein each of the plurality of spokes is secured to a segment of the plurality of segments.

In one embodiment, the hub includes a radially asymmetric attachment point for each of the plurality of spokes.

In one embodiment, each of the plurality of spokes includes a bending preload.

In one embodiment, the hub, the outer cylinder assembly, and the plurality of spokes are integrally provided as one continuous body.

In one embodiment, each spoke of the plurality of spokes is a distinct part.

In one embodiment, each spoke of the plurality of spokes includes a plurality of sheets, stacked adjacent to each other.

In one embodiment, the plurality of sheets includes a damping sheet.

In one embodiment, the hub includes a hollow cylinder.

In one embodiment, the hub includes an expandable bushing in the hollow cylinder.

In one embodiment, the assembly includes a brace configured to limit motion of the hub with respect the outer cylinder assembly in degrees of freedom other than rotation about the axis of the hub.

In one embodiment, the assembly includes a hard stop configured to limit the range of rotation of the hub with respect to the outer cylinder assembly.

In one embodiment, at least two negative stiffness torsional springs are connected in parallel.

In one embodiment, the assembly includes at least two negative stiffness torsional springs, connected in series.

In one embodiment, the assembly includes: a negative stiffness torsional spring; and a positive stiffness torsional spring, connected in series.

In one embodiment, the assembly includes: a negative stiffness torsional spring; and a positive stiffness torsional spring, connected in parallel.

According to an embodiment of the present invention there is provided a method of forming a negative stiffness torsional spring, the method including: providing a hub, a plurality of spokes, and an outer cylinder assembly; and preloading each of the plurality of spokes with a compressive preload.

In one embodiment, the providing of the hub, the plurality of spokes, and the outer cylinder assembly includes: providing an inner load-bearing shaft; providing an outer load-bearing shaft, having an inner surface which is tapered along a portion of the length of the outer load-bearing shaft; and providing a spoke assembly including: an inner cylinder; an outer cylinder; and the plurality of spokes connecting the inner cylinder and the outer cylinder; and the preloading of each of the plurality of spokes with the compressive preload includes pressing the spoke assembly onto the inner load-bearing shaft and into the outer load-bearing shaft.

In one embodiment, the outer cylinder is segmented into a plurality of segments, each of the plurality of segments being connected to a spoke of the plurality of spokes.

In one embodiment, the providing of the hub, the plurality of spokes, and the outer cylinder assembly includes: providing the hub to include a hollow cylinder having a plurality of slots parallel to the axis of the hollow cylinder; and providing the plurality of spokes as distinct parts.

In one embodiment, the preloading of each of the plurality of spokes with the compressive preload includes inserting each of the plurality of spokes into a corresponding one of the plurality of slots, and inserting a tapered pin axially into the hollow cylinder.

In one embodiment, the preloading of each of the plurality of spokes with the compressive preload includes inserting each of the plurality of spokes into a corresponding one of the plurality of slots, providing an expandable bushing in the hollow cylinder, and producing a radial expansion in the expandable bushing.

In one embodiment, the providing of the hub, the plurality of spokes, and the outer cylinder assembly includes: providing an inner load-bearing shaft; providing an outer load-bearing shaft; providing a spoke assembly including: an inner cylinder; an outer cylinder; and the plurality of spokes connecting the inner cylinder and the outer cylinder; the outer diameter of the outer ring exceeding the inner diameter of the outer load-bearing shaft, and the outer diameter of the inner load-bearing shaft exceeding inner diameter of the inner ring; and the preloading of each of the plurality of spokes with the compressive preload includes: bringing the inner load-bearing shaft to a first temperature; bringing the spoke assembly to a second temperature; bringing the outer load-bearing shaft to a third temperature; the first temperature being lower than the second temperature, and the second temperature being lower than the third temperature; assembling the inner load-bearing shaft, the outer load-bearing shaft, and the spoke assembly to form an assembly in which the inner load-bearing shaft passes through the inner ring, and the spoke assembly is within the outer load-bearing shaft; and allowing the temperatures of the inner load-bearing shaft, the outer load-bearing shaft, and the spoke assembly to become the same.

BRIEF DESCRIPTION OF THE DRAWINGS

These and other features and advantages of the present invention will become appreciated as the same become better understood with reference to the specification, claims and appended drawings wherein:

FIG. 4A is a side cross-sectional view of an assembly with negative torsional stiffness during and after assembly, according to an embodiment of the present invention;

FIG. 4B is a top view of a spoked subassembly according to an embodiment of the present invention;

FIG. 4C is a top view of a spoked subassembly after the application of a compressive preload according to an embodiment of the present invention;

FIG. 7A is a side cross-sectional view of an assembly with negative torsional stiffness prior to the application of a compressive preload according to an embodiment of the present invention;

FIG. 7B is a side cross-sectional view of an assembly with negative torsional stiffness after the application of a compressive preload according to an embodiment of the present invention;

FIG. 7C is a side cross-sectional view of an assembly with negative torsional stiffness prior to the application of a compressive preload according to an embodiment of the present invention;

FIG. 7D is a side cross-sectional view of an assembly with negative torsional stiffness after the application of a compressive preload according to an embodiment of the present invention;

FIG. 8A is a perspective view of a spoke according to an embodiment of the present invention;

FIG. 8B is a perspective view of a spoke according to an embodiment of the present invention;

FIG. 8C is a perspective view of a spoke according to an embodiment of the present invention;

DETAILED DESCRIPTION

The detailed description set forth below in connection with the appended drawings is intended as a description of exemplary embodiments of an assembly with negative torsional stiffness, e.g., a negative stiffness torsional spring, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
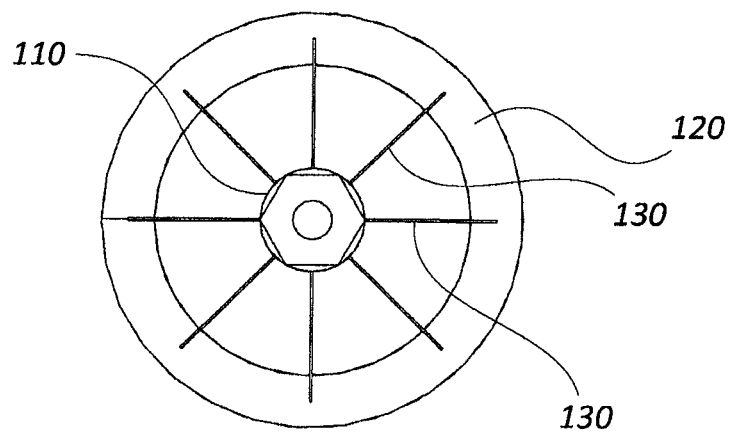
FIG. 1A is a top view of a negative stiffness torsional spring according to an embodiment of the present invention.
Figure 1B:
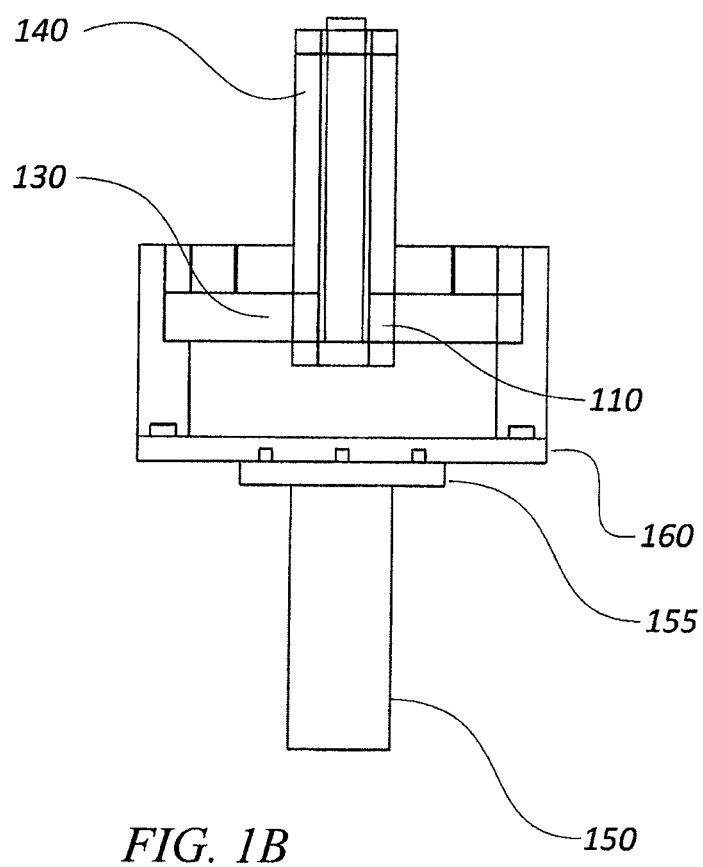
FIG. 1B is a side view of a negative stiffness torsional spring according to an embodiment of the present invention.
Figure 1C:
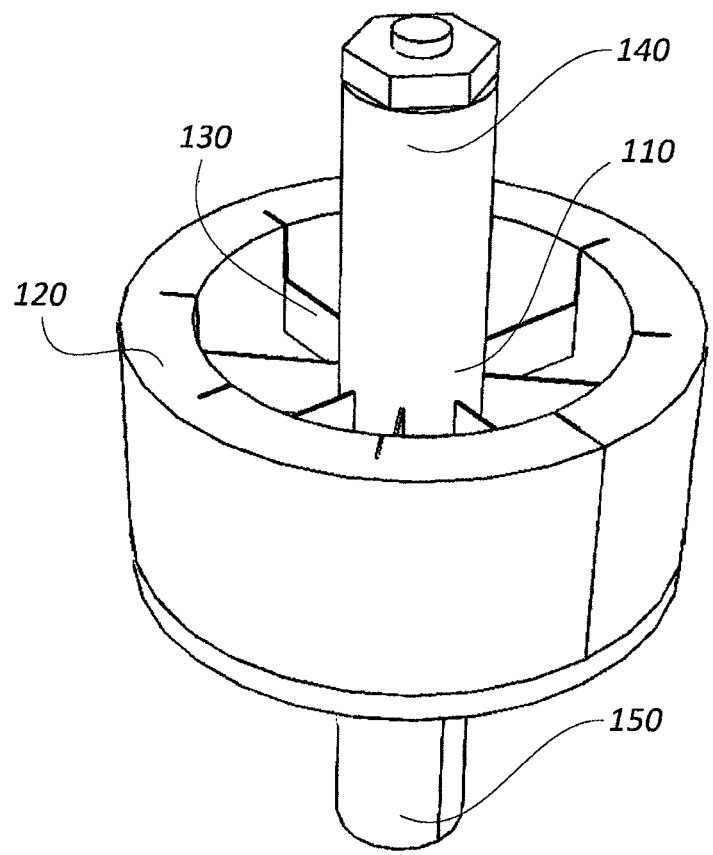
FIG. 1C is a perspective view of a negative stiffness torsional spring according to an embodiment of the present invention.
Figure 1D:
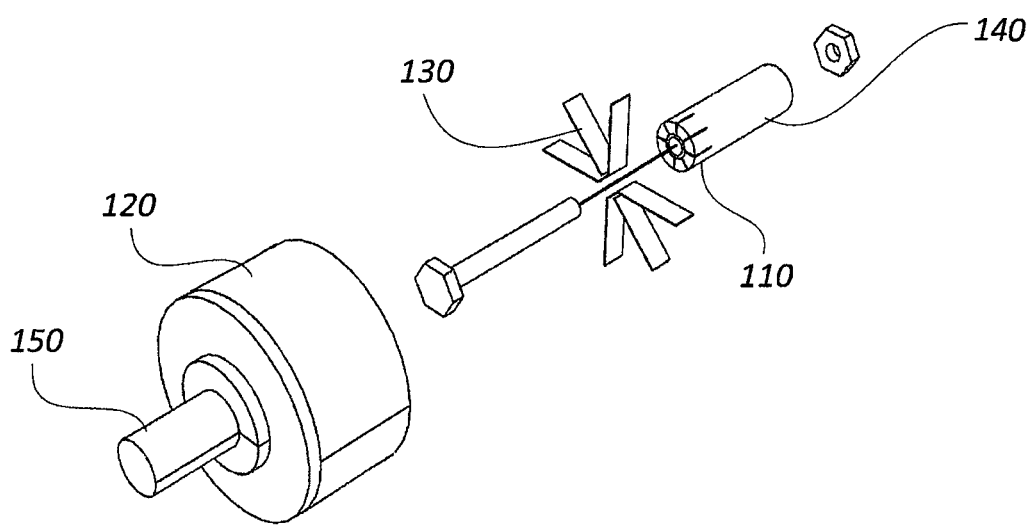
FIG. 1D is an exploded perspective view of a negative stiffness torsional spring according to an embodiment of the present invention.

Referring to FIG. 1A, in one embodiment an assembly with negative torsional stiffness includes several spokes 130, secured between a central hub 110 and an outer cylinder assembly 120. Each spoke 130 may have the form of a blade, e.g., its length may be greater than its width, which in turn may be greater than its thickness, where the length is measured in the radial direction, the width is measured in the axial direction, and the thickness is measured in the direction perpendicular to the length and the width. Each spoke 130 may be formed of a single, continuous material, or it may be a composite structure, composed, for example, of laminated layers of different materials. An inner load-bearing shaft 140 may be secured to the central hub 110 or, as illustrated in FIG. 1C, the hub 110 may be an integral part of the inner load-bearing shaft 140. An outer load-bearing shaft 150 may be secured to the outer cylinder assembly 120, by a flange 155 on the outer load-bearing shaft 150, or a combination of a flange 155 and a disk 160, as illustrated in FIG. 1B. Referring to FIG. 1D, the spokes 130 may be separate, distinct parts which fit into slots in the hub 110 and (FIG. 1C) in the outer cylinder assembly 120. In one embodiment, the spokes 130 are subjected, as a result of the construction of the assembly with negative torsional stiffness, to a compressive preload.

Figure 2B:
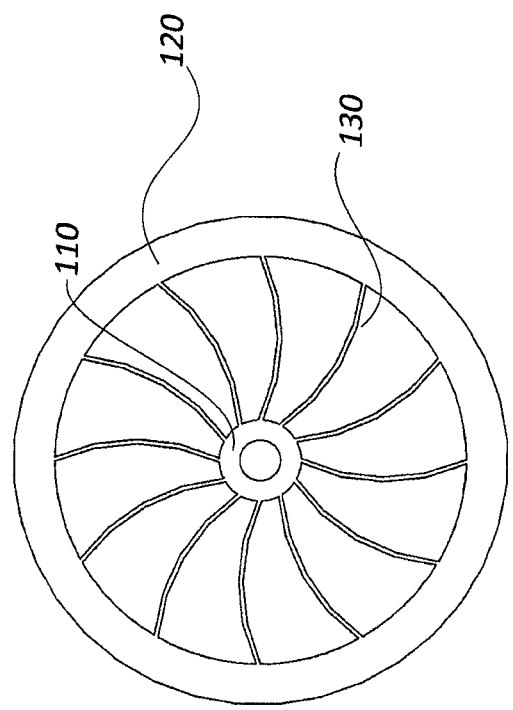
FIG. 2B is a top view of a spoked subassembly in a second bi-stable position according to an embodiment of the present invention.
Figure 2A:
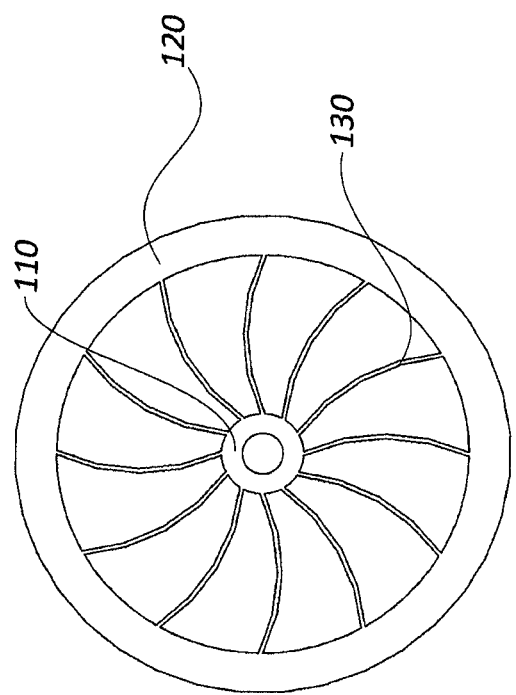
FIG. 2A is a top view of a spoked subassembly in a first bi-stable position according to an embodiment of the present invention.

Referring to FIG. 2A, if the compressive preload is sufficiently great, i.e., if the free length of each spoke 130 exceeds the difference between the inner radius of the outer cylinder assembly 120 and the outer radius of the hub 110 by a sufficiently large amount, then in a first bi-stable position the spokes 130 may be curved. Moreover, the point at which each spoke 130 connects with the outer cylinder assembly 120 may also be offset from, i.e., not radially aligned with, the point at which the spoke 130 connects with the hub 110. The curvature, or the offset, or both, may allow a spoke 130 with a free length exceeding the radial separation between the hub 110 and the outer cylinder assembly 120 to fit between the two. In this first bi-stable position, no external torque is applied to the hub 110 or to the outer cylinder assembly 120. If an external torque is then applied to cause the hub 110 to rotate relative to the outer cylinder assembly 120, the spokes 130 may be subjected to a compressive force, which increases as the hub 110 rotates, and which causes the spokes 130 to become compressed, or shortened. As the hub 110 continues to rotate it will reach a point at which the spokes 130 are compressed to the maximum possible extent; this point is an unstable equilibrium point at which, again, no external torque is applied. Beyond this point, as the hub 110 is rotated further, the spokes 130 begin to lengthen again, until a second bi-stable position, an example of which is illustrated in FIG. 2B, is reached.

Figure 3:
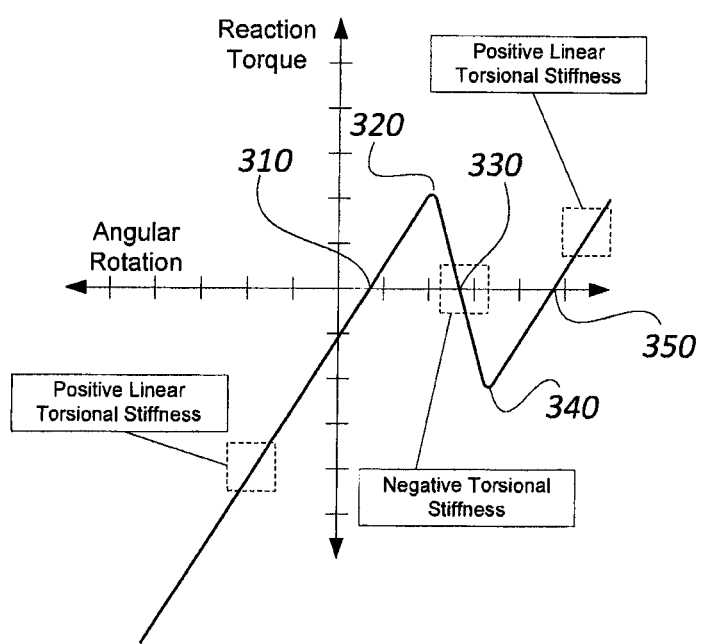
FIG. 3 is a graph of reaction torque as a function of angular rotation according to an embodiment of the present invention.

Referring to FIG. 3, the torque as a function of the hub 110 angle may be illustrated with a graph. Between the first bi-stable point 310, corresponding to the first bi-stable position, and the unstable equilibrium point 330, there is a first point of maximum external torque 320, i.e., the point at which the rate of increase of the mechanical energy stored in the compressive strain of the spokes 130, with respect to the angle of the hub 110, is greatest. As the hub 110 is turned past this point, the torque decreases, i.e., the torsional stiffness, which is the rate of change of torque with angle, is negative. The torque continues to decrease to the unstable equilibrium point 330, and then becomes negative, i.e., instead of resisting the continued rotation of the hub 110, the torque is in a direction tending to urge the hub 110 to turn further. The torque continues to decrease, i.e., increase in the negative direction, to a point of maximum negative torque 340, and then increases back to zero at the second bi-stable point 350. For angles beyond the second bi-stable point, the torque is positive and linear.

If the assembly with negative torsional stiffness is installed in a mechanical drive train presenting significant torsional compliance to either the inner load-bearing shaft 140, which is connected to the hub 100, or to the outer cylinder assembly 120, which is connected to the outer load-bearing shaft 150, then at some point in the range of angles of negative stiffness, the assembly with negative torsional stiffness may snap abruptly to a new position, as energy stored in the spokes is released and transferred to compliant elements in the mechanical drive train. The material of which the spokes 130 are composed may be selected to have sufficient elastic strain energy density to prevent damage to the spokes as they snap between such states. High strength structural steels (maraging, tool, and spring steels) may be used for this application, but titanium alloys, aluminum alloys, amorphous metals, and engineering plastics may also be used for the spokes 130. For all of these materials, conventional additive methods, e.g., selective laser sintering or three dimensional (3D) printing, or subtractive methods, e.g., electrical discharge machining (EDM) or laser cutting, may be used in manufacturing processes to form the desired features. In embodiments in which the spokes 130 are distinct parts, laminated polymer matrix composite materials may be used for the spokes 130, with the predominant fiber orientation along the length, i.e., the radial direction, of each spoke.

Referring to FIG. 4A, in one embodiment, a negative stiffness torsional spring is fabricated from a hollow outer load-bearing shaft 150, a solid inner load-bearing shaft 140 in the form of a rod, and a spoked subassembly 410 including a hollow cylinder 420, a hub 110, and a number of spokes 130. The hollow cylinder 420 may be segmented as shown in FIG. 4B, with one segment anchoring the outer end of each spoke 130. The outer load-bearing shaft 150 may have the form of a tube, with an internal taper 425. As fabricated, the spoked subassembly 410 may have straight spokes 130, and a hollow cylinder 420 having an outside diameter less than the inside diameter of the outer load-bearing shaft 150 at the wide end of its internal taper 425, and greater than the inside diameter of the outer load-bearing shaft 150 at the narrow end of its internal taper 425. When the spoked subassembly 410 is then pressed into the outer load-bearing shaft 150, the segments of the hollow cylinder 420 may be compressed together, reducing the effective outside diameter and inside diameter of the hollow cylinder 420. This results in a preload on the spokes 130, which may assume a curved shape in response. In one embodiment, the inner load-bearing shaft 140 is threaded along a first portion of its length, e.g., the upper portion in the view of FIG. 4A, and it is smooth, i.e., unthreaded, and sized to be a press-fit in a central hole in the hub, at the portion where the hub 110 is seated when the assembly with negative torsional stiffness is complete. The spoked subassembly 410 may be assembled with the inner load-bearing shaft 140 and with the outer load-bearing shaft 150 by placing the spoked subassembly 410 onto the threaded portion of the inner load-bearing shaft 140, and tightening a nut onto the threaded portion of the inner load-bearing shaft 140, while holding the inner load-bearing shaft 140 and the outer load-bearing shaft 150 fixed, until the spoked subassembly 410 is pressed into its installed position. In one embodiment, the inner load-bearing shaft 140 has a stepped diameter, and when the assembly with negative torsional stiffness is complete, the hub 110 is seated against the shoulder formed by the step in the diameter. In this embodiment, the hollow cylinder 420, together with the surrounding portion of, or all of, the outer load-bearing shaft 150, forms an outer cylinder assembly 120 for the negative stiffness torsional spring.

Figure 5B:
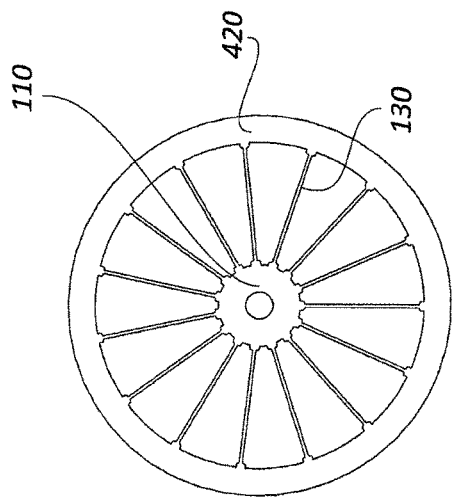
FIG. 5B is a top view of a spoked subassembly according to an embodiment of the present invention.
Figure 5D:
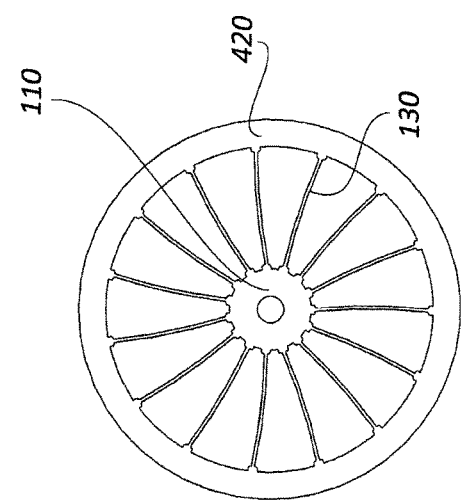
FIG. 5D is a top view of a spoked subassembly according to an embodiment of the present invention.
Figure 5A:
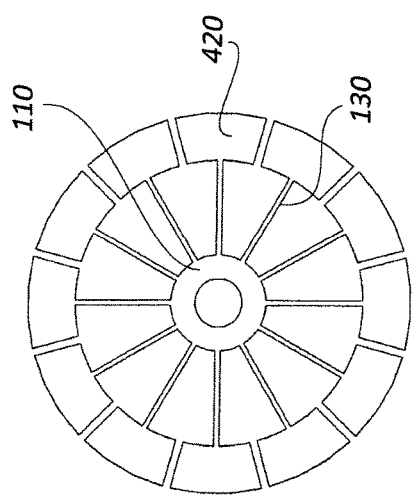
FIG. 5A is a top view of a spoked subassembly according to an embodiment of the present invention.
Figure 5C:
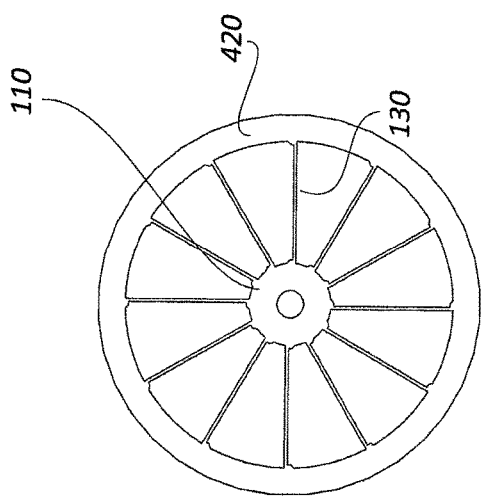
FIG. 5C is a top view of a spoked subassembly according to an embodiment of the present invention.

Referring to FIGS. 5A-5D, spoked subassemblies for use in the embodiment of FIG. 4A or for use in other embodiments may take several forms. Referring to FIG. 5A, an embodiment (illustrated also in FIG. 4B) provides a segmented hollow cylinder 420. In this embodiment, constricting the hollow cylinder 420 compresses the spokes 130 while the segments may approach each other, allowing the inner diameter of the hollow cylinder 420 to be reduced until the gaps between adjacent segments are closed, without significant strain in the outer cylinder. In this embodiment the compressive preload force is carried primarily by the spokes 130, which may become curved as a result. Referring to FIG. 5B, in another embodiment, the hollow cylinder 420 is solid with tapered features that may be added at the attachment points of the spokes to increase the mechanical strength at these interfaces and to allow the use of thinner (i.e., lower thickness) spokes, which reduces the amount of compressive force required to cause bending of the spokes. Referring to FIG. 5C, in another embodiment, the attachment points of the spokes 130 to the hub 110 are radially asymmetric, i.e., a line which is tangential to the centerline of a spoke 130 at its attachment point to the hub 110 may not pass through the center of the hub 110. In this case when a compressive preload is applied to the spokes 130, all of the spokes 130 will preferentially deform in the same rotational direction, i.e., all will deform clockwise or all will deform counterclockwise. Referring to FIG. 5D, in another embodiment, the spoked subassembly 410 is fabricated with pre-curved spokes 130, i.e., with a bending preload, so that the spokes 130 are initially longer than the separation between the hub 110 and the hollow cylinder 420. A spoked subassembly 410 of one of the varieties shown in FIGS. 5A-5D may be fabricated as an integral unit, i.e., as a continuous body, by cutting the desired shape from a solid sheet of material, e.g., using a laser cutting method or by electrical discharge machining (EDM).

Figure 6A:
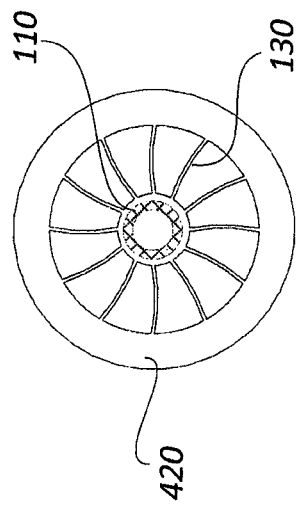
FIG. 6A is a perspective view of a spoked subassembly and a cold-work die according to an embodiment of the present invention.

Referring to FIG. 6A, in one embodiment a negative stiffness torsional spring is fabricated from a spoked subassembly 410 with a monolithic hollow cylinder 420, i.e., a hollow cylinder 420 that is not segmented, such as that illustrated in FIG. 5B. If the spoked subassembly 410 is formed with a hollow hub 110, then a cold-work die 610 having a tapered portion, e.g., a taper of less than 4%, may be drawn through the hole in the hub 110, slightly enlarging both the inner and the outer diameter of the hub 110, and preloading the spokes 130 with a compressive preload as a result. In response to this compressive preload, the spokes 130 may buckle, e.g., become curved, as in FIG. 6B. In one embodiment, the die is sized so that the plastic stress field extends far enough into the hub 110 to provide a sufficient compressive preload to the spokes 130, but not far enough as to plastically deform the spokes 130 themselves.

Figure 6B:
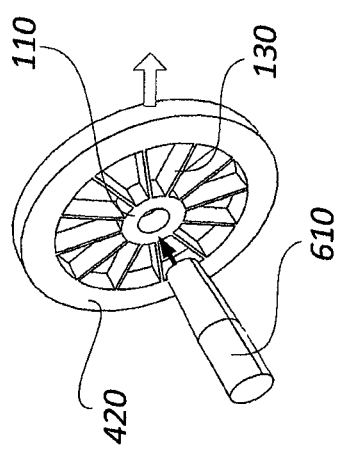
FIG. 6B is a top view of a spoked subassembly after the application of a compressive preload according to an embodiment of the present invention.

It should be noted that in the first or second bi-stable positions the shapes of the curved spokes need not be as illustrated in, for example, FIG. 2A, 2B, or 6B. The spokes may assume other curved shapes depending on their composition, the nature of their attachments to the hub and to the outer cylinder assembly, and whether the width, or thickness, or both, of each spoke are constant along the spoke's length. The spokes may, for example, be curved into an "S" shape, with an inflection point at which the curvature vanishes.

In another embodiment, a spoked subassembly 410 may be formed with a solid hollow cylinder 420, and a tubular outer load-bearing shaft 150 or other tubular element may be fabricated to have an inside diameter slightly smaller than the outside diameter of the spoked subassembly 410. The spoked subassembly 410 may then be cooled until it has contracted sufficiently, fit into the tubular element, and then be allowed to return to room temperature. During warming, the enclosing tubular element may constrain the expansion of the hollow cylinder 420, resulting in a compressive preload being applied to the spokes 130. In another embodiment, in which the hub 110 has a central through-hole, an inner load-bearing shaft 140 may be fabricated to be an interference fit in the through hole, and it may be cooled to a lower temperature than the temperature to which the spoked subassembly 410 is cooled, so that upon warming, the expanding inner load-bearing shaft 140 may provide a compressive preload by causing the hub 110 to expand.

Referring to FIG. 7A, in another embodiment, the hub 110 may be a hollow cylinder, or tube, with radial slots through which the spokes 130 may extend into the interior of the hub 110. Pressing a tapered insert 710 into the central channel of the hub 110 may then force the spoke 130 ends part-way out of the slots, providing a compressive preload to the spokes 130, as shown in FIG. 7B. Referring to FIG. 7C, in another embodiment, an expandable bushing 720 may be inserted into the central channel of the hub 110, and compressed axially, causing it to expand radially, preloading the spokes 130 as shown in FIG. 7D. In one embodiment, an expandable bushing available from SHUR-LOK™ Company, of Irvine, Calif., is used. In embodiments in which the spokes 130 are fit into slots in the hub 110 or in the outer cylinder assembly 120, they may be secured in place at one or both ends by use of an interference fit, adhesive, or frictional or mechanical pressure.

In some embodiments, as in those of FIGS. 5A-5D, the hub 110 may be a single monolithic element and in some it may be a compound or composite part, as in the embodiments shown in FIGS. 7A-7D. Thus, as used herein, the term hub refers to a central portion to which the spokes 130 are secured, which may be a single monolithic element as in FIGS. 5A-5D, or may be a compound or composite part, as in FIGS. 7A-7D; in some embodiments it may be formed as a portion of an inner load-bearing shaft 140 as in the embodiment of FIGS. 1A-1D. Similarly the outer cylinder assembly, as used herein, refers to a component or assembly to which the outer ends of the spokes 130 are secured. The outer cylinder assembly 120 may be a single monolithic element or a compound part, and it may be an integral part of the outer load-bearing shaft 150. In embodiments in which the spokes 130 lack, or in which the spoked subassembly 410 lacks, a radial asymmetry, such as the radial asymmetry present in FIGS. 5C and 5D, a small tangential force may be applied to each spoke 130, e.g., a small clockwise force may be applied to each spoke 130 or a small counterclockwise force may be applied to each spoke 130, during the process of applying the compressive preload, to ensure that all of the spokes 130 assume the same bi-stable position when the application of the compressive preload is complete.

Referring to FIG. 8A, a spoke 130 may be a single monolithic blade. In other embodiments, it is a blade composed of a stack of sheets (FIG. 8B) or a composite structure composed of a damping sheet, i.e., a soft, viscoelastic constrained damping layer 810, sandwiched between two stiff constraining layers 820 (FIG. 8C). A blade composed of a stack of sheets may also provide damping, as a result of energy-dissipating friction between the sheets.

Figure 9:
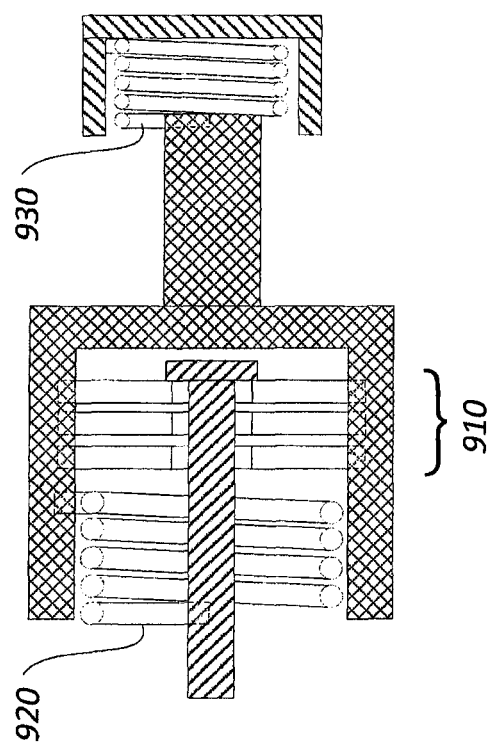
FIG. 9 is a side cross-sectional view of an assembly including parallel and series combinations of negative stiffness torsional springs and positive springs, according to an embodiment of the present invention.

Referring to FIG. 9, negative stiffness torsional springs may be combined in parallel with other negative stiffness torsional springs to form a parallel-connected negative stiffness torsional spring combination 910, which may in turn be connected with a parallel-connected positive spring 920, or a series-connected positive spring 930, or both, as illustrated. In other embodiments other parallel or series combinations are constructed. Two negative stiffness torsional springs may be connected in series, for example, by arranging them end to end with a common centerline, and connecting the inner load-bearing shaft 140 of one to the outer load-bearing shaft 150 of the other. In another embodiment, a positive spring and a slightly softer negative spring are connected in parallel, to form a very soft positive stiffness spring. Tuning the total stiffness, in such an embodiment, by selecting a suitable positive spring, may be more convenient than tuning the stiffness of the negative spring by adjusting its compressive preload.

Referring to FIG. 10, in one embodiment one or more braces 1010 are used to constrain the motion of the hub 110 and inner load-bearing shaft 140 relative to the outer cylinder assembly 120. The braces 1010 may be in the form of two plates, each having a through hole through which the inner load-bearing shaft 140 passes, and each secured to the outer cylinder assembly 120, so that the negative stiffness torsional spring is bracketed between the plates. Such braces 1010 help to prevent motion of the inner load-bearing shaft 140 relative to the outer cylinder assembly 120 in rotational degrees of freedom except rotation about the axis of the inner load-bearing shaft 140, and also to prevent translation of the inner load-bearing shaft 140 relative to the outer cylinder assembly 120. One or more nuts may be installed on the inner load-bearing shaft 140, adjacent to one of the braces 1010, to constrain axial translation of the inner load-bearing shaft 140. As illustrated in FIG. 10 the braces 1010 are transparent; in other embodiments they may be opaque.

Figure 10B:
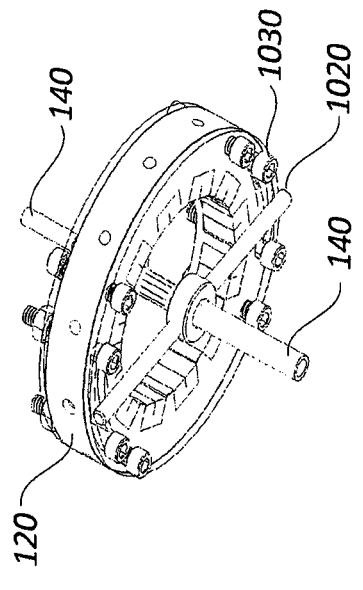
FIG. 10B is another perspective view of an assembly with negative torsional stiffness with braces and a hard stop, according to an embodiment of the present invention.
Figure 10A:
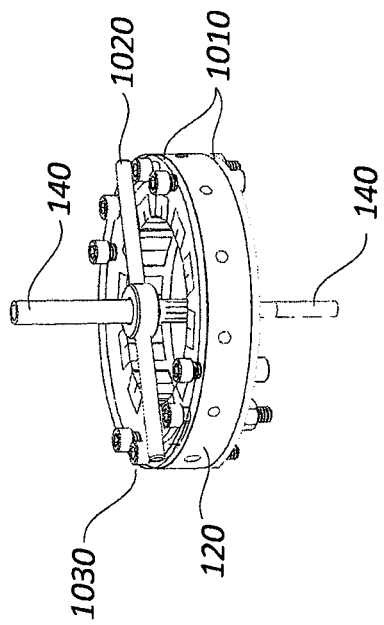
FIG. 10A is a perspective view of an assembly with negative torsional stiffness with braces and a hard stop, according to an embodiment of the present invention.

In one embodiment also shown in FIG. 10A and FIG. 10B, an assembly with negative torsional stiffness may include a hard stop to limit the range of rotation of the hub 110 with respect to the outer cylinder assembly 120. The hard stop may be composed of a perpendicular bar 1020 secured to the inner load-bearing shaft 140 and extending outwards from the centerline of the inner load-bearing shaft 140 so that at a point in the rotation of the inner load-bearing shaft 140 the perpendicular bar 1020 contacts a feature protruding from the outer cylinder assembly 120, such as the head of a bolt 1030. In one embodiment the bolt may fit into a curved slot in the outer cylinder assembly 120, allowing its position, and, correspondingly, the range of rotation, to be adjusted. Once the perpendicular bar 1020 contacts the head of the bolt, the load path shifts to pass through the perpendicular bar, and the assembly with negative torsional stiffness becomes torsionally rigid. Such features may be used to protect elements of the negative stiffness torsional spring, to provide an assembly the stiffness of which increases when a certain maximum angle of rotation is reached, or to couple the responses of several assemblies with negative torsional stiffness, connected in cascade i.e., in series.

Multiple assemblies with negative torsional stiffness may be combined, e.g., in series or in parallel. If the elements are all connected to the same outer load-bearing shaft 150, i.e., connected in parallel, then the effect may be to increase their negative and positive stiffness values, with snap-through between the two bi-stable states occurring at approximately the same level of angular rotation. Conversely, the stacked elements may be joined to separate outer load-bearing shafts 150, i.e., connected in series, which may increase the effective angular range of the system. As one element snaps through between its bi-stable states and engages the hard stop, it may become torsionally rigid and engage the next element in the chain. This cascading approach to element stacking may be used to increase the non-linear operating range of the system without dramatically increasing the package volume.

In a parallel combination of a negative stiffness torsional spring and a positive stiffness torsional spring, the positive stiffness element may serve to bias the negative stiffness element back to its original bi-stable state upon removal of the torsional moment. The utility of such an approach is that the negative stiffness element may absorb energy from an overload or vibratory condition by snapping to the second bi-stable state. The rotation associated with this snap-through may trigger a reaction moment from the positive element and cause the negative element to snap back to its initial state. Such an assembly may then mitigate additional overloads or act as a phase lag mechanism for damping oscillatory motion. For example, a positive spring connected in parallel with a negative stiffness torsional spring may have a disfavored second bi-stable position as a result of a preload bias, from the positive spring, tending to cause a rotation towards the first bi-stable position. If an inertial mass is connected to such a structure, it may return to the first bi-stable position if pushed in the direction of the second bi-stable position with sufficient angular momentum.

Although exemplary embodiments of an assembly with negative torsional stiffness have been specifically described and illustrated herein, many modifications and variations will be apparent to those skilled in the art. Accordingly, it is to be understood that an assembly with negative torsional stiffness constructed according to principles of this invention may be embodied other than as specifically described herein. The invention is also defined in the following claims, and equivalents thereof.

What is claimed is:

1. An assembly comprising:
   a negative stiffness torsional spring, comprising:
      a hub;
      an outer cylinder assembly, concentric with the hub; and
      a plurality of elastically buckled spokes consisting of all spokes of the torsional spring, the plurality of elastically buckled spokes having a compressional preload, each spoke of the plurality of elastically buckled spokes being
         secured to the hub,
         secured to the outer cylinder assembly, and
         curved, a curve of each of the plurality of elastically buckled spokes being in the same direction as a corresponding curve of all of the other spokes of the plurality of elastically buckled spokes; and
   a positive stiffness torsional spring connected in series with the negative stiffness torsional spring.

2. The assembly of claim 1, wherein the compressional preload is sufficient to cause the torsional stiffness to be negative at one rotational position of the hub with respect to the outer cylinder assembly.

3. The assembly of claim 1, wherein:
   the outer cylinder assembly comprises a hollow cylinder; and
   each spoke is secured to the inner surface of the hollow cylinder.

4. The assembly of claim 3, wherein the hollow cylinder is segmented into a plurality of segments, and wherein each of the plurality of spokes is secured to a segment of the plurality of segments.

5. The assembly of claim 1, wherein the hub comprises a radially asymmetric attachment point for each of the plurality of spokes.

6. The assembly of claim 1, wherein the hub, the outer cylinder assembly, and the plurality of spokes are integrally provided as one continuous body.

7. The assembly of claim 1, wherein each spoke of the plurality of elastically buckled spokes is a distinct part.

8. The assembly of claim 1, wherein each spoke of the plurality of elastically buckled spokes comprises a plurality of sheets, stacked adjacent to each other.

9. The assembly of claim 8, wherein the plurality of sheets comprises a damping sheet.

10. The assembly of claim 1, wherein the hub comprises a hollow cylinder.

11. The assembly of claim 10, wherein the hub comprises an expandable bushing in the hollow cylinder.

12. The assembly of claim 1, further comprising a brace configured to limit motion of the hub with respect the outer cylinder assembly in degrees of freedom other than rotation about the axis of the hub.

13. The assembly of claim 1, further comprising a hard stop configured to limit the range of rotation of the hub with respect to the outer cylinder assembly.

14. The assembly of claim 1, further comprising a second negative stiffness torsional spring, connected in parallel to the negative stiffness torsional spring.

15. The assembly of claim 1, further comprising:
a second positive stiffness torsional spring,
connected in parallel with the negative stiffness torsional spring.

16. A method of forming an assembly, the method comprising:
forming a negative stiffness torsional spring comprising:
providing a hub, a plurality of spokes consisting of all spokes of the torsional spring, and an outer cylinder assembly; and
preloading each of the plurality of spokes with a compressive preload, wherein:
the providing of the hub, the plurality of spokes, and the outer cylinder assembly; and
the preloading of each of the plurality of spokes with a compressive preload, results in the plurality of spokes being elastically buckled to have a curve, the curve of each of the plurality of elastically buckled spokes being in the same direction as a corresponding curve of all of the other spokes of the plurality of elastically buckled spokes; and
connecting a positive stiffness torsional spring in series with the negative stiffness torsional spring.

17. The method of claim 16, wherein
the providing of the hub, the plurality of spokes, and the outer cylinder assembly comprises:
providing an inner load-bearing shaft;
providing an outer load-bearing shaft, having an inner surface which is tapered along a portion of the length of the outer load-bearing shaft; and
providing a spoke assembly comprising:
an inner cylinder;
an outer cylinder; and
the plurality of spokes connecting the inner cylinder and the outer cylinder;
and the preloading of each of the plurality of spokes with the compressive preload comprises pressing the spoke assembly onto the inner load-bearing shaft and into the outer load-bearing shaft.

18. The method of claim 17, wherein the outer cylinder is segmented into a plurality of segments, each of the plurality of segments being connected to a spoke of the plurality of spokes.

19. The assembly of claim 1, wherein the hub is disposed between at least two of the plurality of elastically buckled spokes.

20. The assembly of claim 1, wherein the same direction is defined as an orientation around a rotational axis of the hub.

21. The assembly of claim 1, wherein each spoke of the plurality of elastically buckled spokes is pre-curved in the same direction as a further curvature resulting from the compressional preload.

22. The assembly of claim 21, wherein each spoke of the plurality of elastically buckled spokes has a curved shape lacking an inflection point along the length of the spoke between the hub and the outer cylinder assembly.

23. The method of claim 16, further comprising pre-curving each of the plurality of spokes prior to preloading each of the plurality of spokes with a compressive preload, wherein the curve is in the same direction as the pre-curving.

24. The method of claim 23, wherein the pre-curving of each of the plurality of spokes comprises pre-curving each of the plurality of spokes with a curved shape lacking an inflection point.

25. The assembly of claim 1, wherein the spokes of the plurality of elastically buckled spokes are uniformly distributed in angle about the hub.

26. The assembly of claim 1, wherein:
the hub comprises a plurality of radial slots, each having an axial length less than an axial length of the hub; and
the outer cylinder assembly comprises a plurality of radial slots, each extending part-way through a thickness of the outer cylinder assembly.

27. The assembly of claim 26, wherein a spoke of the plurality of elastically buckled spokes:
extends into a radial slot of the plurality of radial slots of the outer cylinder assembly and into a radial slot of the plurality of radial slots of the hub, and
is secured in the hub via a bolt.

28. The assembly of claim 1, further comprising an outer load-bearing shaft coupled to the outer cylinder assembly, and wherein the positive stiffness torsional spring is coupled to the outer load-bearing shaft.

* * * * *